(12) United States Patent
Jette

(10) Patent No.: US 6,449,912 B2
(45) Date of Patent: *Sep. 17, 2002

(54) CABLE SUPPORT APPARATUS

(76) Inventor: Roger Jette, 38 W. Islip Rd., West Islip, NY (US) 11795

(*) Notice: Subject to any disclaimer, the term of this patent is extended or adjusted under 35 U.S.C. 154(b) by 0 days.

This patent is subject to a terminal disclaimer.

(21) Appl. No.: 09/883,570

(22) Filed: Jun. 18, 2001

Related U.S. Application Data (63) Continuation of application No. PCT/US99/30174, filed on Dec. 17, 1998, and a continuation-in-part of application No. 08/927,506, filed on Sep. 11, 1997, now Pat. No. 5,953,870.
(60) Provisional application No. 60/112,908, filed on Dec. 18, 1998.

(51) Int. Cl.$^7$ .................................................. E04C 2/52
(52) U.S. Cl. ........................ 52/220.1; 52/126.2; 52/263; 248/49
(58) Field of Search ............................ 52/220.1, 126.2, 52/263; 248/49

(56) References Cited

U.S. PATENT DOCUMENTS

| | | |
|---|---|---|
| 3,363,048 A | 1/1968 | Vaughn |
| 3,844,440 A | 10/1974 | Hadfield et al. |
| 4,124,324 A | 11/1978 | Augis et al. |
| 4,372,510 A | 2/1983 | Skypala |
| 4,593,499 A | 6/1986 | Kobayashi et al. |
| 4,596,095 A | 6/1986 | Chalfant |
| 4,612,746 A | 9/1986 | Higgins |
| 4,630,417 A | 12/1986 | Collier |
| 4,676,036 A | 6/1987 | Bessert |
| 4,765,576 A | 8/1988 | Peled |
| 4,850,162 A | 7/1989 | Albrecht |
| 5,049,700 A | 9/1991 | Kobayashi et al. |
| 5,123,618 A | 6/1992 | Gutterman et al. |
| 5,263,289 A | 11/1993 | Boyd |
| 5,389,737 A | 2/1995 | Kobayashi et al. |
| 5,412,914 A | 5/1995 | Daw et al. |
| 5,477,649 A | 12/1995 | Bessert |
| 5,483,776 A | 1/1996 | Poppe |
| 5,548,932 A | 8/1996 | Mead |
| RE35,479 E | 3/1997 | Witherbee et al. |
| 5,628,157 A | 5/1997 | Chen |
| 5,630,300 A | 5/1997 | Chen |
| 5,673,522 A | 10/1997 | Schilham |
| 5,697,193 A | 12/1997 | Forslund, III et al. |
| 5,768,840 A | 6/1998 | Feldpausch et al. |

FOREIGN PATENT DOCUMENTS

| | | |
|---|---|---|
| DE | 2155 625 | 11/1971 |
| EP | 0399 790 | 5/1990 |
| EP | 0 683 554 A1 | 5/1994 |
| FR | 2 599 906 | 6/1986 |
| GB | 2 015 268 | 9/1979 |
| WO | WO 90/10966 | 9/1990 |

Primary Examiner—Beth A. Stephan
(74) Attorney, Agent, or Firm—Carter, Deluca, Farrell & Schmidt, LLP (57) ABSTRACT

An intersection member is provided for use in a raised floor system having a plurality of support pedestals, a plurality of floor panels, and at least one cable support apparatus wherein the intersection member includes a cable support section, and connecting portions extending from the cable support section, the connecting portions being configured and dimensioned to retain the cable support section in place when positioned at the intersection of at least two cable pathways. A hardware mounting assembly is provided for mounting hardware relative to a cable support apparatus, which includes a bracket portion configured and dimensioned to support various hardware components and position the components relative to a cable support apparatus, and a plurality of notches formed along the bracket portion, the notches being configured and dimensioned to engage portions of the cable support apparatus such that the bracket portion is maintained a predetermined relative distance from the cable support apparatus.

10 Claims, 14 Drawing Sheets

CABLE SUPPORT APPARATUS

CROSS REFERENCE TO RELATED APPLICATIONS

This application is a continuation of and claims priority to International Application Serial No. PCT/US99/30174, filed Dec. 17, 1998, which application: 1) claims priority to and benefit of U.S. application Ser. No. 60/112,908 filed Dec. 18, 1998; and 2) is a continuation-in-part of U.S. application Ser. No. 08/927,506, filed Sep. 11, 1997, now U.S. Pat. No. 5,953,870.

BACKGROUND

1. Technical Field

The present disclosure relates to cable support assembly and more particularly to a cable support assembly for use in connection with a raised floor system.

2. Description of Related Art

Raised floor systems have been developed to provide the additional utility space needed in various different conduit or cable intensive environments where the original construction did not provide adequate means of accommodating the vast amount of conduit or cable. For example, probably the most common environment requiring vast amounts of additional protected space is for large computing systems. Such installations were typically made in facilities which simply were not designed to accommodate the vast amount of cable runs required to operate the typical large computer system. Other applications where additional utility space is required include mechanical systems, e.g., heating, ventilating and air conditioning systems.

A common problem experienced in utilizing raised floor systems is maintaining organization of the various cables, conduits, pipes, etc. which are routed beneath the floor system. One solution to this problem is to provide a cable tray system beneath the floor panels of the raised floor to contain and direct cables along their respective pathways. An example of such a cable tray system is disclosed in U.S. Pat. No. 4,596,095 which issued on Jun. 24, 1986 to Chalfant (the "'095 Chalfant Patent"). The '095 Chalfant Patent features a modular cable tray assembly which is formed from modular sections which include a number of different components all of which must be separately assembled to form the cable tray. For example, the cable tray includes separate straight sections, horizontal bend sections, horizontal tee sections, horizontal cross-intersection sections, as well as splice plates to connect the various components to each other as well as supporting the assembled cable tray above the building floor. Such a cable tray assembly is, therefore, independent of the raised floor system.

One drawback of such a raised floor and cable support system is the additional labor required to assemble the various components of the separate raised floor and cable support systems. In geographic regions with particularly high labor rates, the cost of erecting such a labor intensive dual system could prove to be cost prohibitive.

Another drawback of such a system is that the amount of space required by the structural supporting components of the two separate systems leaves less space available for carrying and organizing larger numbers of cable runs.

Yet another drawback of installing independent raised floor and cable support systems is the cost of procuring the materials required for two separate support structures. These additional labor and material costs can significantly increase the overall cost of installing a complete system.

An alternative solution to supporting cable runs below a raised floor assembly is proposed in U.S. Pat. No. 5,548,932 which issued on Aug. 27, 1996 to Mead (the "'932 Mead Patent"). The '932 Mead Patent features a height adjustable cable tray support system which includes a number of separate components which must be assembled to form the cable support system. Plates which support the cable tray are secured by welding or other methods to the pedestals of the existing raised floor system featured in the '932 Mead Patent. Additionally, support rods are required in the '932 Mead Patent cable tray support system, which support the cable tray on the support plates.

One disadvantage of such a system is the labor intensive nature of the installation. In particular, each support plate must be separately secured to the floor system pedestals and the support rods and cable tray sections must be installed. This combined with the cost of the material components required for such a system can add significant cost to the installation of the complete system.

Accordingly, there is a continuing need for improved raised floor and cable management systems which require fewer number of components. A need also exists for raised floor and cable management systems which are easier to install than existing systems and which provide increased storage capacity and accessibility.

SUMMARY

The present disclosure provides a cable support assembly for a raised floor system which overcomes the above-noted and other disadvantages of existing raised floor and cable management systems. Additionally, the present disclosure provides a cable support assembly for raised floor systems which requires many fewer components to assemble thereby resulting in greatly reduced material and labor costs to install a complete raised floor and cable management system or to upgrade an existing raised floor system with the presently disclosed cable support assembly.

In one aspect of the present disclosure an intersection member is provided for use in a raised floor system having a plurality of support pedestals, a plurality of floor panels, and at least one cable support apparatus wherein the intersection member includes a cable support section, and connecting portions extending from the cable support section, the connecting portions being configured and dimensioned to retain the cable support section in place when positioned at the intersection of at least two cable pathways.

The connecting portions may include downwardly oriented tip portions which are configured and dimensioned to interact with a cable support apparatus of a raised floor system such that the intersection member is supported by the cable support apparatus. In one embodiment, the intersection member is open-sided to form a "T" shaped intersection. In an alternative embodiment, the intersection member is generally planar to form a four-way intersection between cable pathways.

In one aspect of the disclosure, the intersecting member may be formed as a lattice work of intersecting members joined together. In one particular configuration, the intersecting members may be formed from wire stock.

The present disclosure further provides a hardware mounting assembly for mounting hardware relative to a cable support apparatus, which includes a bracket portion configured and dimensioned to support various hardware components and position the components relative to a cable support apparatus, and a plurality of notches formed along the bracket portion, the notches being configured and dimensioned to engage portions of the cable support apparatus such that the bracket portion is maintained a predetermined relative distance from the cable support apparatus.

Preferably, the bracket portion is provided with preformed openings therein to receive various hardware components. The hardware mounting assembly may further include a transition portion extending from the bracket portion such that transition portion supports and directs cables when positioned thereon.

The present disclosure includes a cable support assembly for use with a raised floor system having a plurality of support pedestals, the cable support assembly including a plurality of cable support apparatus each having at least one elongated stringer element being supported a predetermined distance away from a base by a first pair of a plurality of support pedestals and a channel section suspended from the at least one elongated stringer element, the channel section being configured and dimensioned to support lengths of cable thereon, and at least one intersection member having a cable support section and connecting portions extending from the cable support section, the connecting portions being configured and dimensioned to retain the cable support section in place when positioned at the intersection of at least two cable pathways.

In a further embodiment, a cable support assembly is provided for use with a raised floor system having a plurality of support pedestals, the cable support assembly including, a plurality of cable support apparatus each having at least one elongated stringer element being supported a predetermined distance away from a base by a first pair of a plurality of support pedestals and a channel section suspended from the at least one elongated stringer element, the channel section being configured and dimensioned to support lengths of cable thereon, and a hardware support member including a bracket portion configured and dimensioned to support various hardware components and position the components relative to a cable support apparatus and a plurality of notches formed along the bracket portion, the notches being configured and dimensioned to engage portions of the cable support apparatus such that the bracket portion is maintained a predetermined relative distance from the cable support apparatus.

In one aspect of the cable support assembly, a transition portion is provided which extends from the bracket portion such that transition portion supports and directs cables when positioned thereon.

BRIEF DESCRIPTION OF THE DRAWINGS

Preferred embodiments of the presently disclosed raised floor system and cable support assembly are described herein with reference to the drawings, wherein.

DETAILED DESCRIPTION OF PREFERRED EMBODIMENTS

Figure 1:
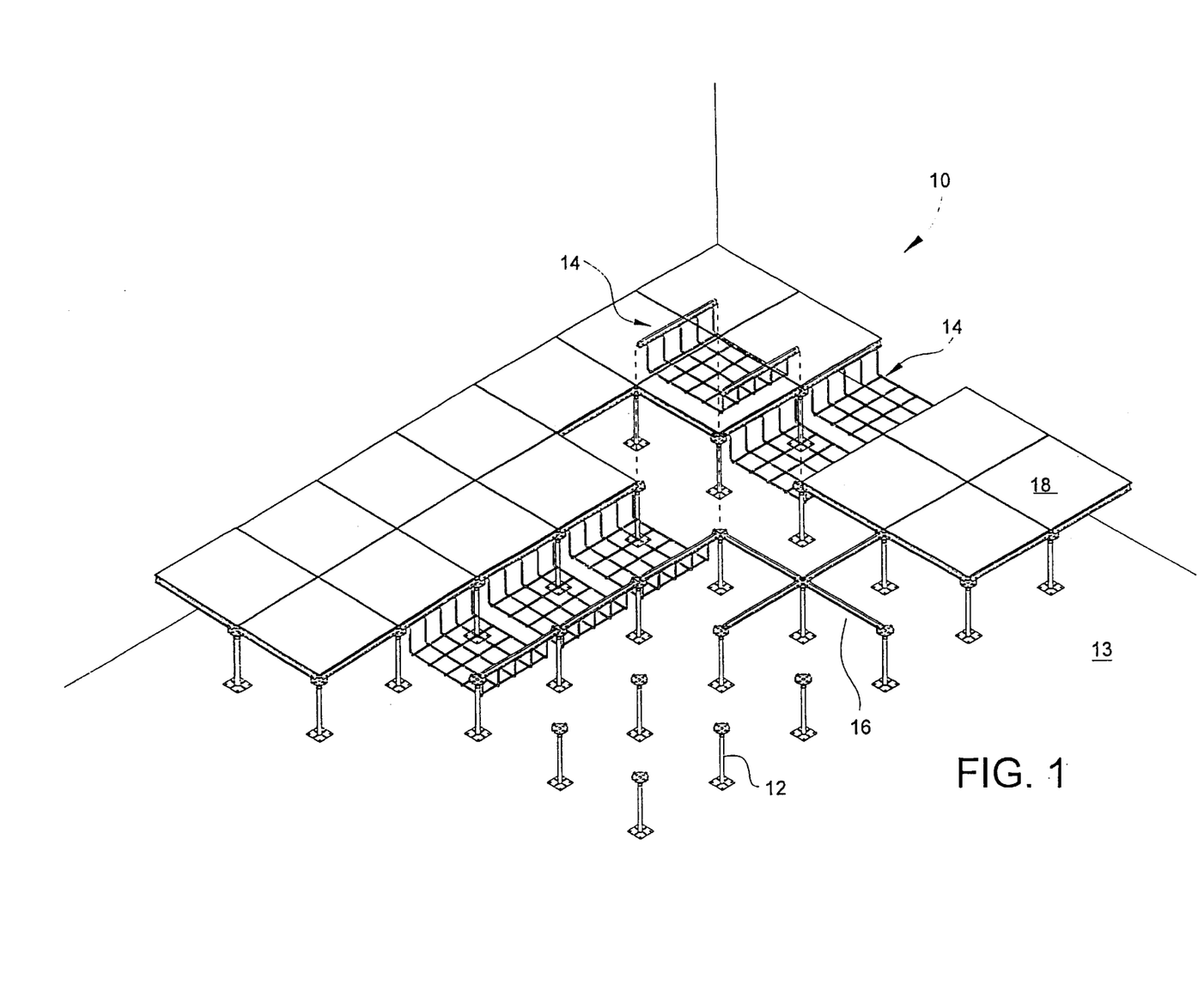
FIG. 1 is a perspective view of one embodiment of a raised floor system constructed in accordance with the present disclosure.

Referring now in specific detail to the drawings in which like reference numerals identify similar or identical elements throughout the several views, and initially to FIG. 1, one embodiment of a raised floor system constructed in accordance with the present disclosure is shown generally as raised floor system 10.

Generally, raised floor system 10 includes a series of support pedestals such as stanchions 12 which are disposed in a predetermined array on a base such as floor 13. A cable support assembly is provided in raised floor system 10 and includes a series of cable support apparatus or sections such as cable baskets 14 which are disposed relative one another to form a predetermined passageway for carrying cables or the like thereon. Preferably cable baskets 14 form an integral part of floor system 10. Stanchions 12 are interconnected by stringer members 16 so as to define a lattice work which receives individual floor panels 18 therein to form the completed raised floor system 10.

In certain installations it may be desirable or necessary to install the cable support assembly as a stand-alone modular assembly. It is within the scope of the present disclosure, that in such an installation, cable baskets 14 will be supported a predetermined distance above the building floor 13 by independent stanchions 12 or other suitable supports which are not also used to support the raised floor system 10.

Figure 2:
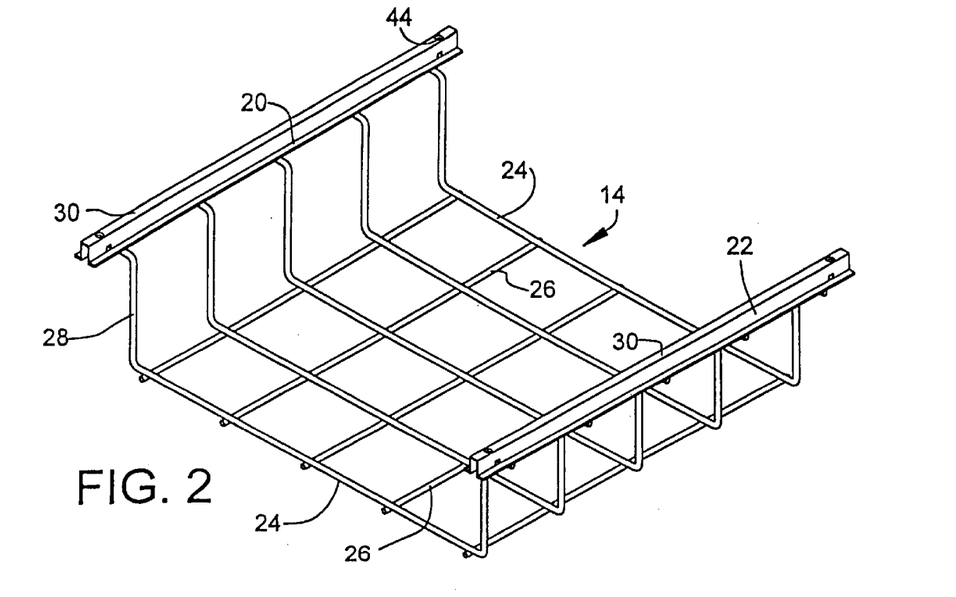
FIG. 2 is a perspective view of a cable support assembly embodiment constructed in accordance with the present disclosure.

Referring now to FIG. 2, cable basket 14 includes first and second elongated stringer elements 20 and 22, respectively. A channel section is suspended from stringers 20 and 22 so as to form a portion of a passageway for supporting cable runs thereon. In the illustrated embodiment, the channel section is formed of an open ended wire stock basket having longitudinal sections 26 attached to transverse sections 24. Transverse sections 24 include riser portions or legs 28 which are attached to the underside of stringers 20 and 22. The various elements of cable support assembly 14 are preferably joined by suitable known techniques, such as by welding.

Although the illustrated channel sections formed of wire stock material, it is within the scope of the present disclosure to use other materials as well. For example, the channel section may be formed of solid or woven fabrications of various metals or any other material suitable for supporting cable runs thereon.

Figure 3:
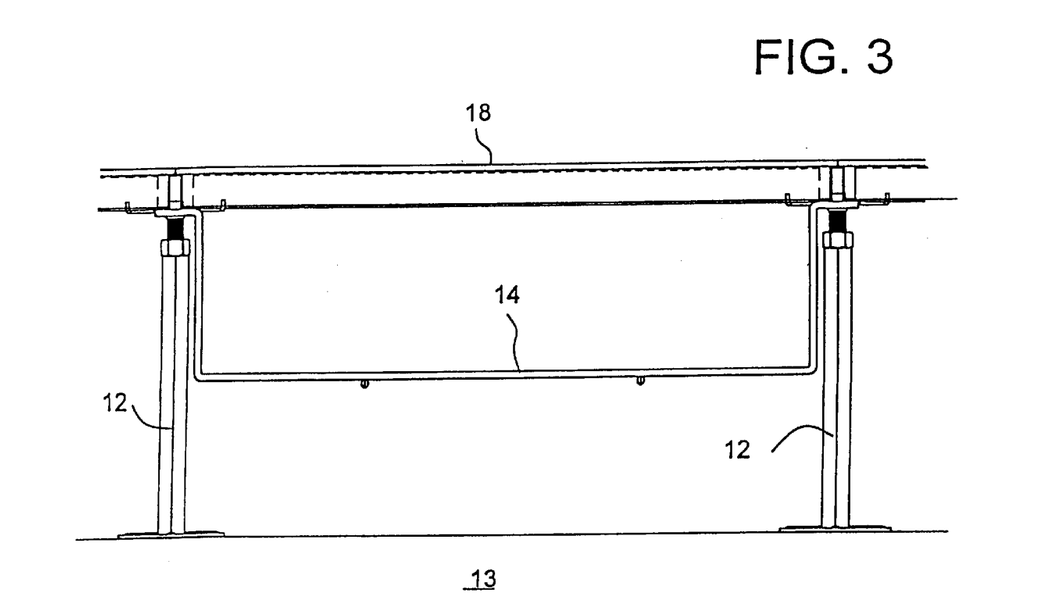
FIG. 3 is a side view of the cable support assembly of FIG. 2 in place in a raised floor system.
Figure 4:
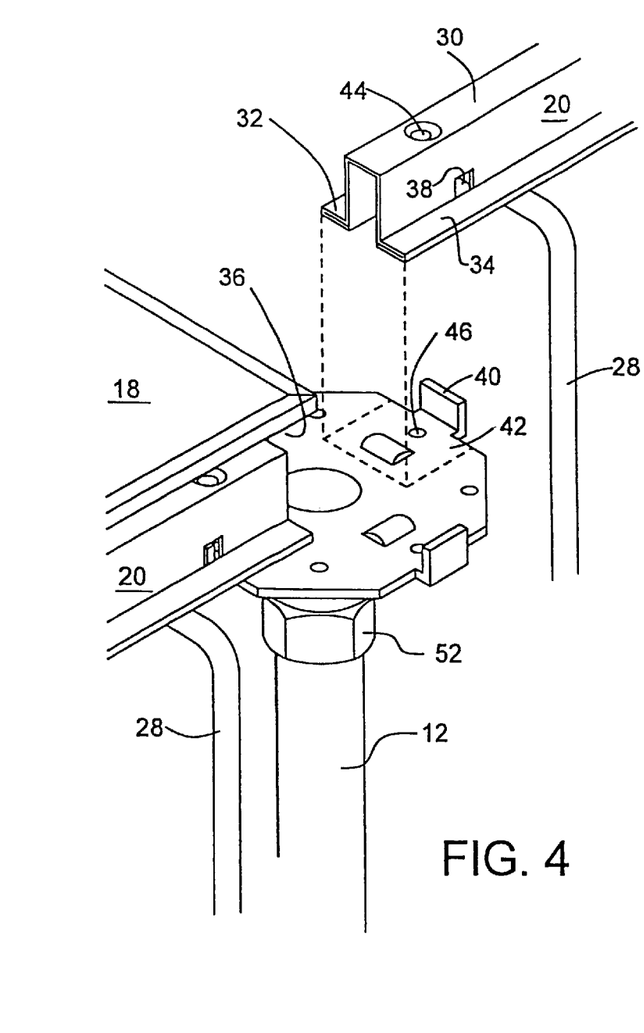
FIG. 4 is an enlarged partial perspective view of a cable support assembly in a raised floor system of the present disclosure.
Figure 5:
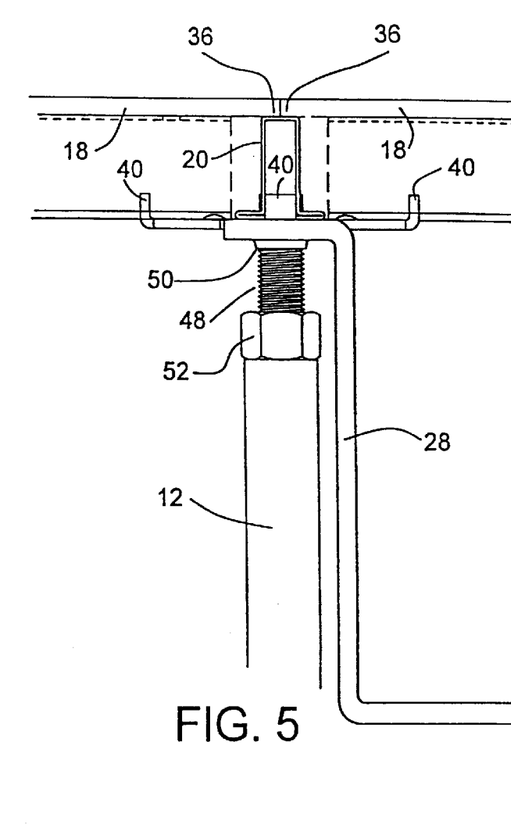
FIG. 5 is a side view showing the cable support assembly partially cut away as installed in the raised floor system of the present disclosure.

Referring now to FIGS. 3–5, the integration of cable baskets 14 into raised floor system 10 will now be described in detail. Preferably, a single section of cable basket 14 is supported by four stanchions 12 (as shown in FIG. 1). However, it is within the scope of the present disclosure that cable baskets 14 may be modified so as to be supported by more or less than four stanchions 12.

As shown in FIG. 3, cable baskets 14 are supported by stanchions 12 such that the longitudinal and transverse elements 26 and 24 respectively are spaced a predetermined distance from the permanent floor 13. When installed, cable baskets 14 do not interfere with the placement or fit of floor panels 18. Rather, cable baskets 14 are designed to be incorporated into existing raised floor systems without departing from the factory design specifications of the floor system. For such installations, cable baskets 14 replace parallel end to end links of stringers 16 from the existing raised floor system.

As shown in FIG. 4, cable support assembly sections 14 include stringer elements such as stringers 20 and 22 which have a cross sectional "top hat" shape that includes an inverted U-shaped cross section portion having flanges 32 and 34 formed on either side. Horizontal surface 30 forms the uppermost surface of stringers 20 and 22. It is on surface 30 which a peripheral flange 36 formed on floor panels 18 rests. As best illustrated in FIG. 5, the peripheral flanges 36 of adjacent floor panels 18 are both supported by a single stringer element 20 or 22 on surface 30. In order to maintain the relative positioning of stringer elements 20 and 22 with respect to stanchion 12, stringer elements 20 and 22 are provided with notched portions 38 which are configured and dimensioned to fit over bracket portions 40 of stanchion base plate 42.

Stringer elements 20 and 22 are further provided with preformed holes 44 which when properly installed are vertically aligned with preformed holes 46 formed in stanchion base plate 42. In this manner, stringer elements 20 and 22 may be secured to stanchion 12 to provide added structural integrity to the overall system. As is common in conventional floor systems, floor system 10 is preferably provided with a high adjustment mechanism to adjust the t of stanchion base plate 42 in order to accommodate slight variances in the subfloor 13. This height adjustment capability may be facilitated by, for example, threaded stud 48 being received in a threaded bore 50 formed in base plate 42 at one end and in a threaded opening of stanchion 12. A nut 52 is provided and is threaded around stud 48 positioned adjacent the top of stanchion tube to facilitate adjustment and locking of the vertical positioning of base plate 42.

Figure 6:
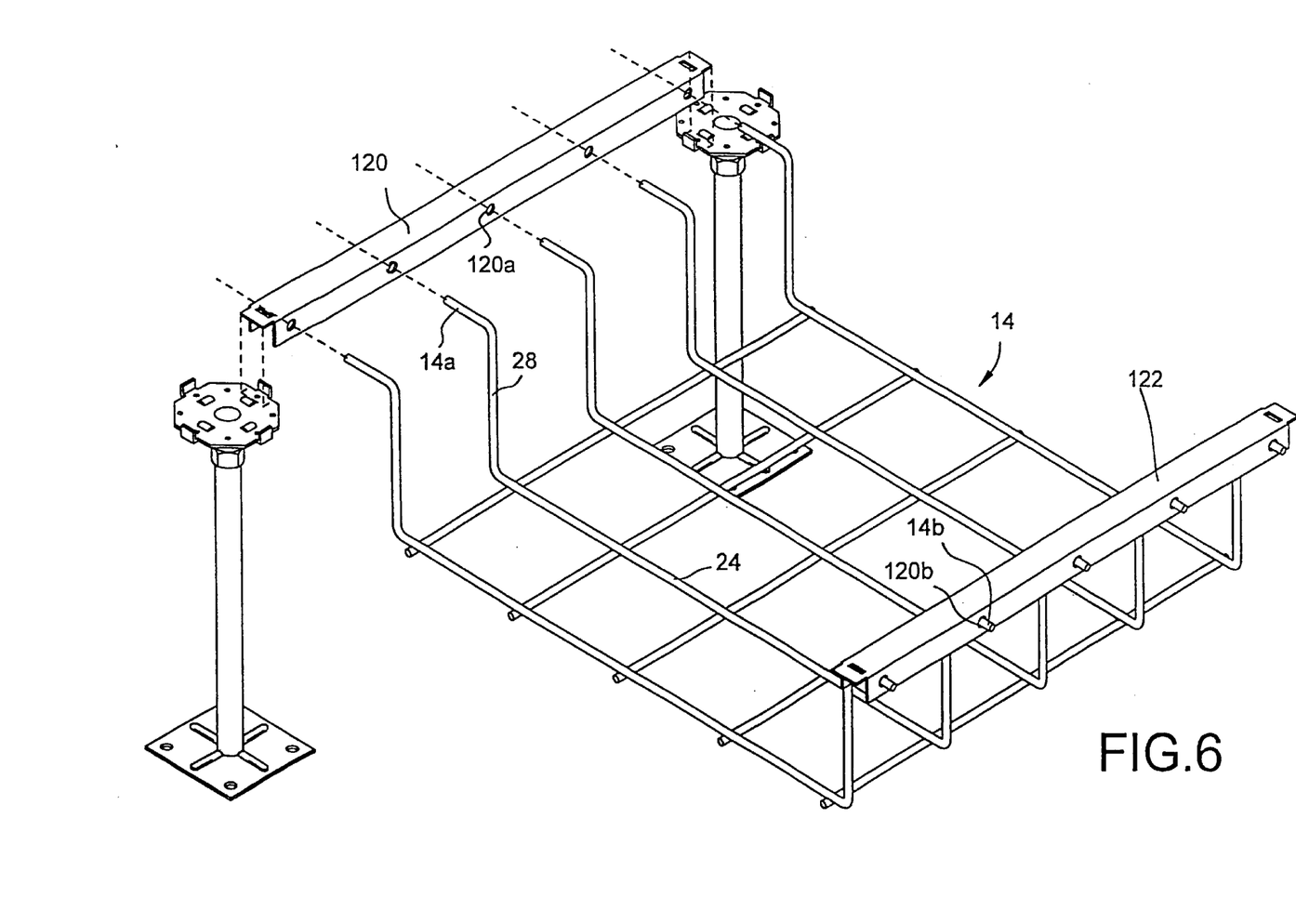
FIG. 6 is a perspective view of a further embodiment of the presently disclosed cable support assembly.

Referring to FIG. 6, an alternative method of attaching the cable basket to the stringers is shown wherein cable basket 14 has portions 14a and 14b which are formed extending outwardly from the upper portions of riser legs 28. Stringers 120 and 122, which are otherwise the same as stringers 20 and 22, are provided with a series of through-holes 120a and 120b, respectively, which may be punched out during formation of the stringers. In this manner, cable basket 14 may be suspended from stringers by inserting leg portions 14a and 14b in through-holes 120a and 120b. It is envisioned that all of the stringers of a raised floor system may be provided with through-holes similar to 120a and 120b so that a cable support system may be installed at any time and placed between any parallel rows of stringers having such support holes.

Alternatively, in existing raised floor systems which do not already have stringers with pre-formed cable basket receiving holes, such as holes 120a and 120b, the stringers positioned where it is desired to support a series of cable baskets 14 could be replaced with stringers having the pre-formed holes.

Figure 7:
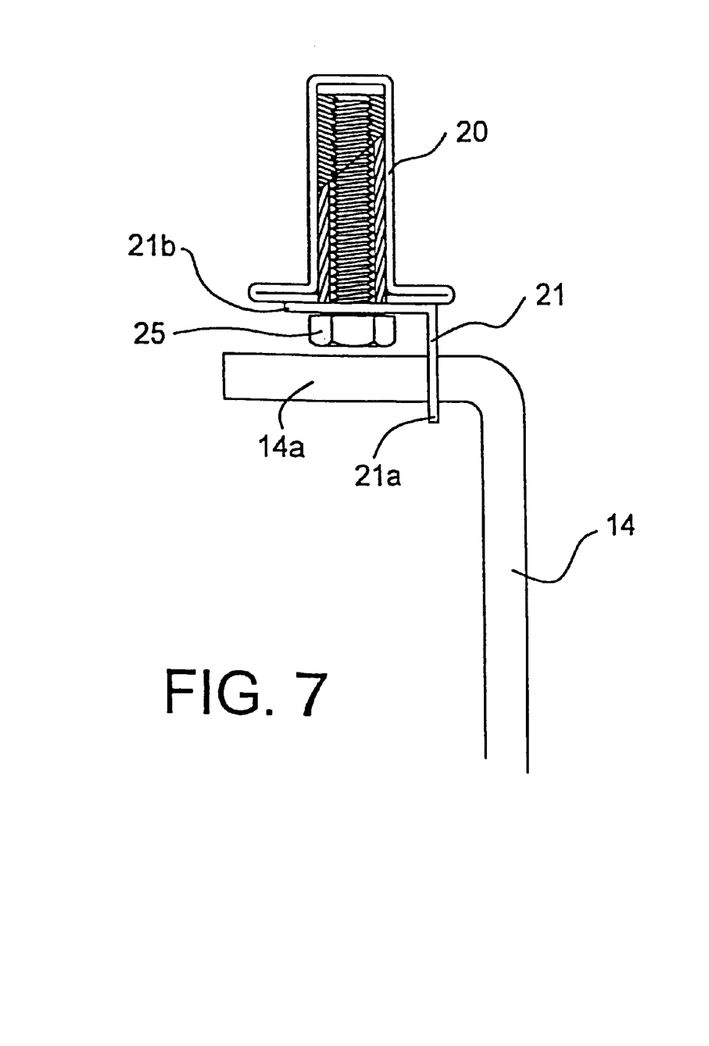
FIG. 7 is a side partial view of an alternative embodiment for mounting the cable support assembly to stringers of a raised floor system.

Referring to FIG. 7, in another alternative embodiment for suspending cable baskets 14 from stringers 20, angled brackets 21 are provided which have leg portions 21a and 21b. Leg portion 21a includes a through hole (shown in phantom lines) which receives leg portion 14a of cable basket 14. Leg portion 21b is bolted into the channel formed in the underside of stringer 20 by an expanding fastener such as wedge-bolt 25.

Figure 8:
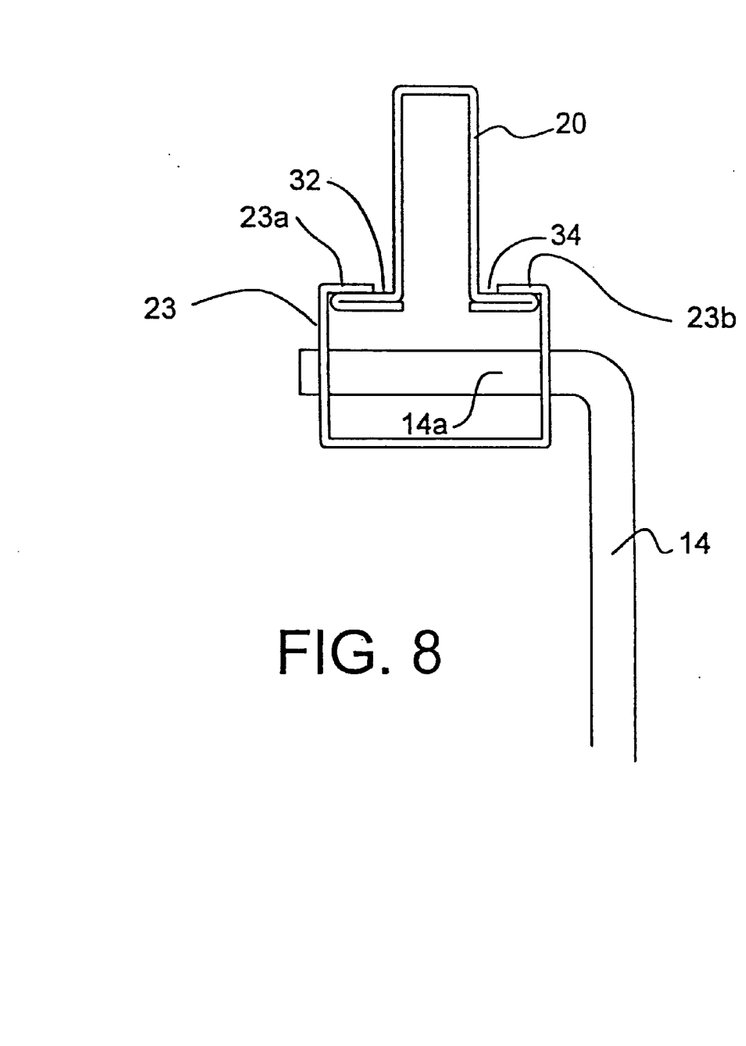
FIG. 8 is a side partial view of a further alternative embodiment for mounting the cable support assembly to stringers of a raised floor system.

Referring to FIG. 8, in a still further alternative embodiment for suspending cable baskets 14 from stringers 20, a series of clips 23 are positioned on stringers 20 by having leg portions 23a and 23b rest upon flanges 32 and 34, respectively. Leg portions 14a of baskets 14 are inserted into receiving holes formed in clips 23. Thus, baskets 14 are suspended from clips 23. In this manner, existing floor system stringers could be utilized to support the added cable baskets defining the cable support assembly.

Figure 9:
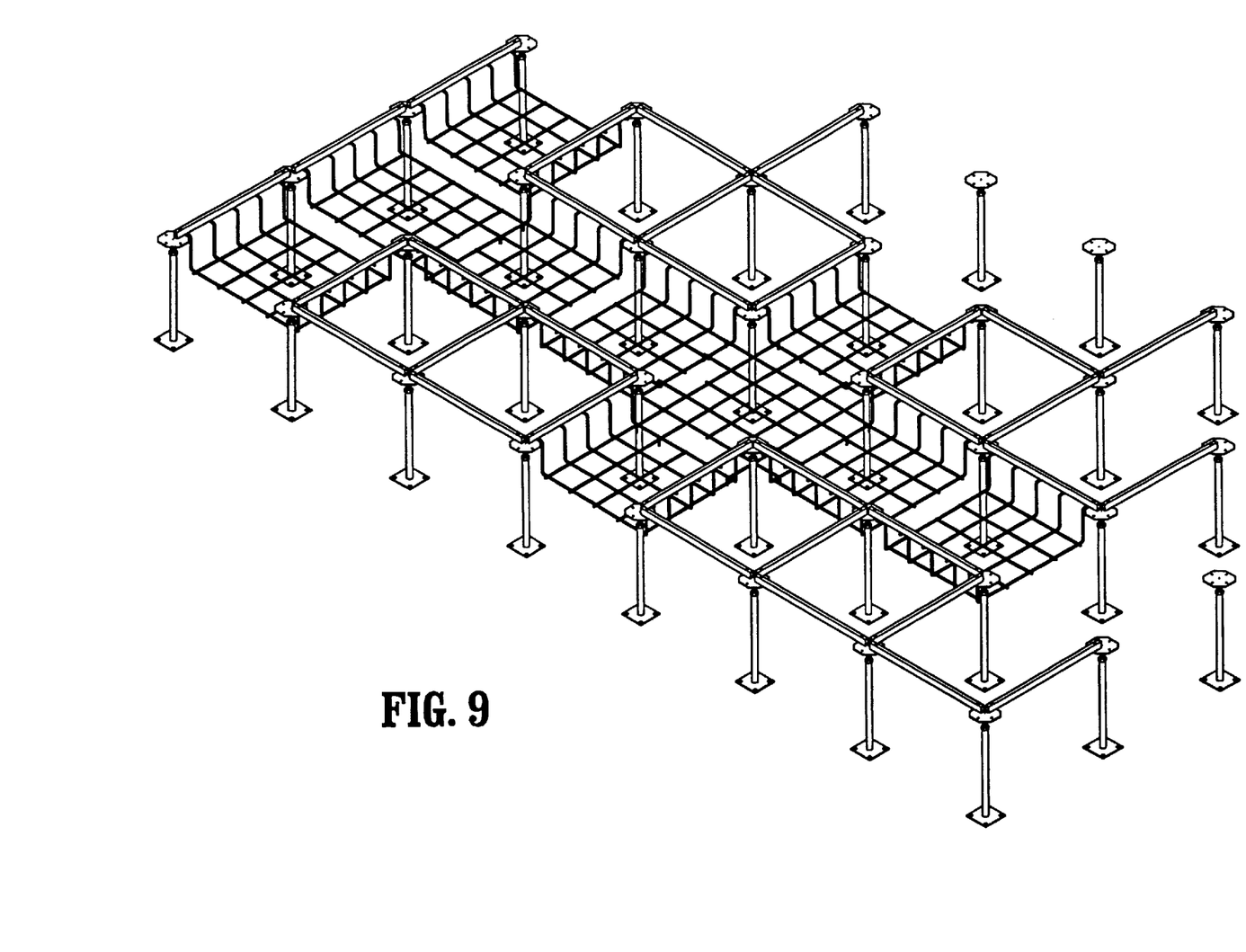
FIG. 9 is a perspective view of the cable support assembly showing junction members in place.

Referring to FIGS. 9–13, intersection transition members will now be described in connection with the cable support system as generally illustrated in FIG. 9. For purposes of clarity, not all of the raised floor system components are shown. In particular, the floor panels and some of the stringer elements are not shown so that the cable pathways and intersections may be illustrated with greater clarity. It should be understood, however, that the features and elements described hereinafter are preferably utilized with a complete raised floor system such as raised floor system 10 of FIG. 1. There may be, however, some applications where it may be desirable or necessary to utilize the cable support assembly described herein as a stand-alone structure without being part of a raised floor system.

Figure 10:
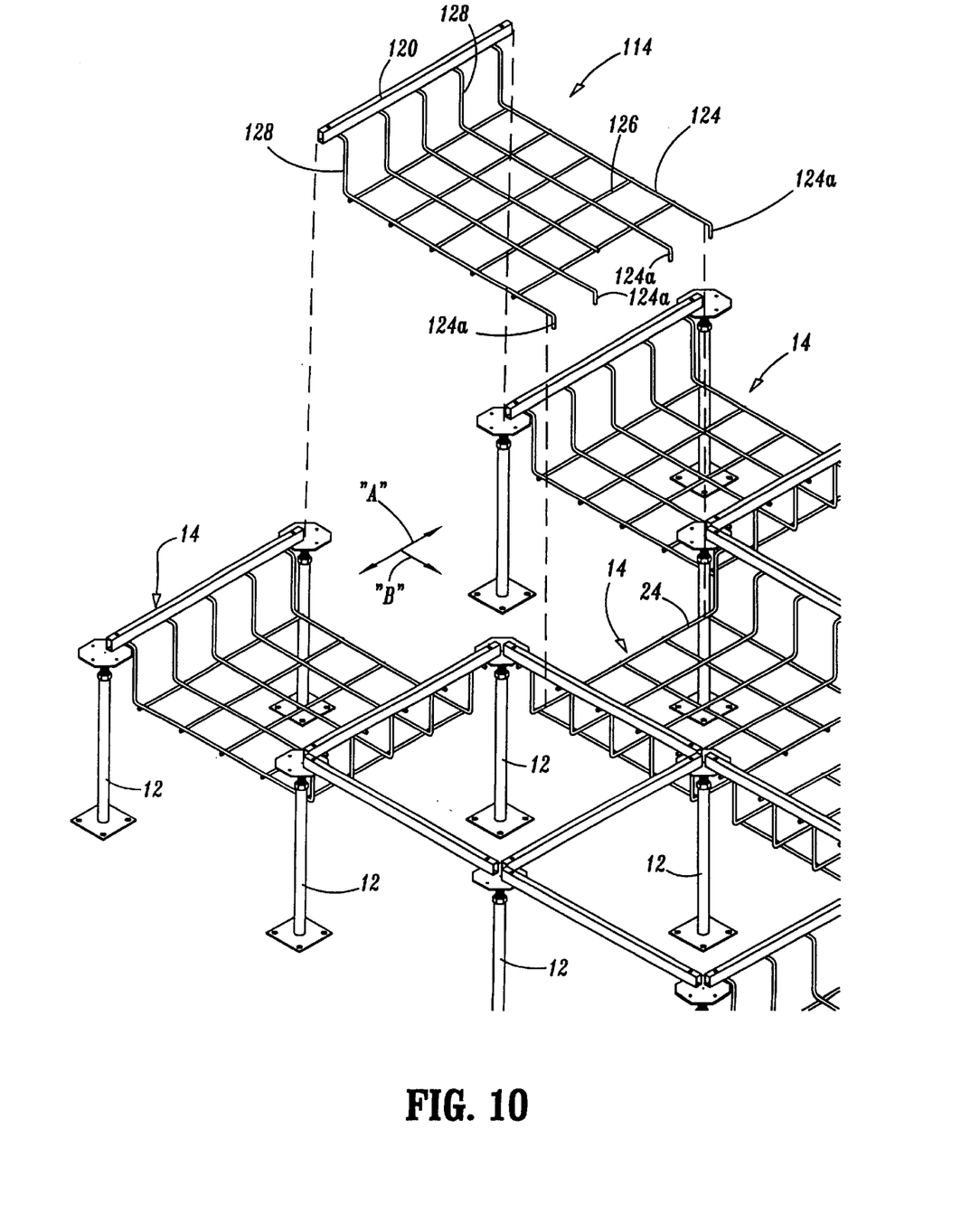
FIG. 10 is an enlarged perspective view which shows a "T" junction member separated away from intersecting pathways.
Figure 11:
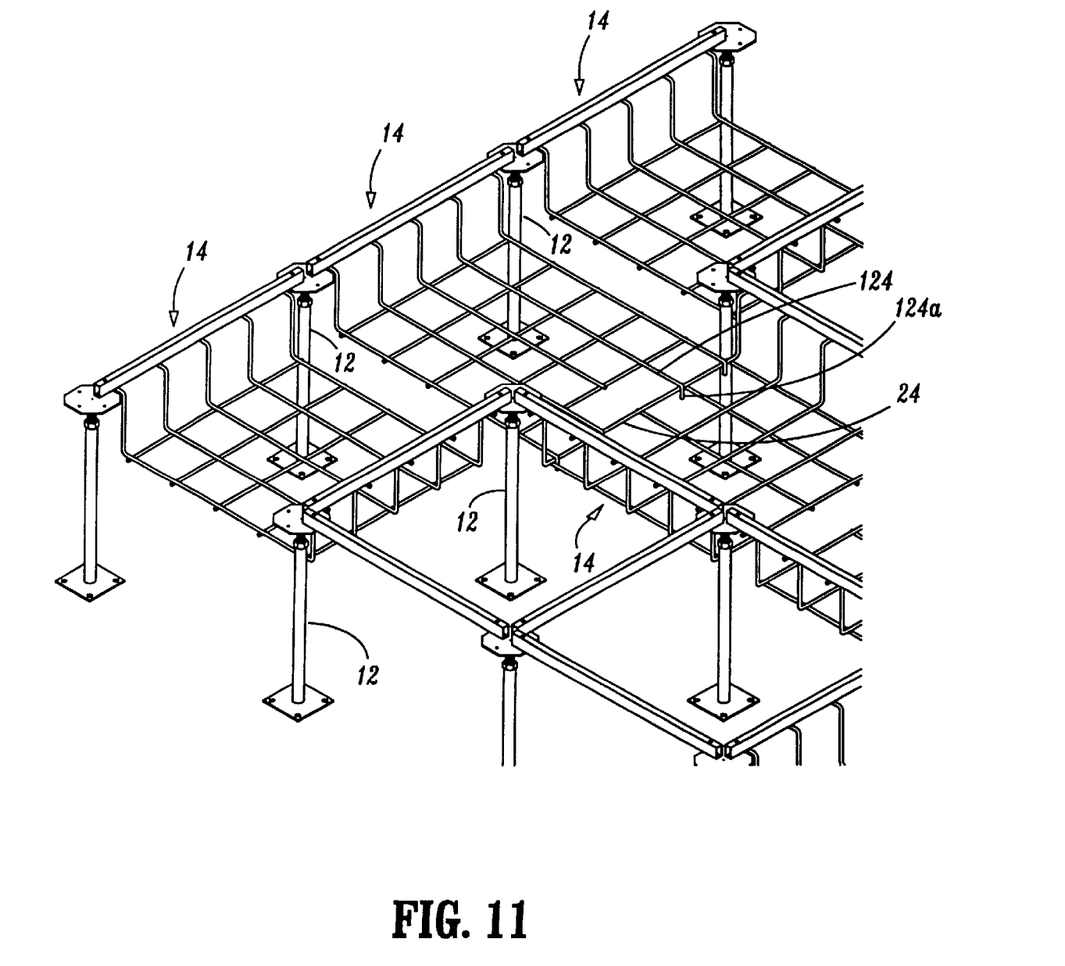
FIG. 11 is a view similar to FIG. 10, which shows the "T" junction member in place at the intersection of two perpendicular pathways.

Referring to FIGS. 9–11, a "T-shaped" intersection of the cable support assembly is shown wherein a special purpose open-sided cable support section such as cable basket 114 is disposed at the juncture of two perpendicular cable support assembly pathways which are generally represented by the double-headed arrow "A" and arrow "B". Cable support pathways "A" and "B" may be formed by assembling cable basket sections 14 in perpendicular linear arrays and supporting them on the matrix of stanchions 12 which form the support structure for the raised floor system. Cable basket 114 may also be arranged with two intersecting pathways to form an "L" or "elbow" shaped intersection of the pathways.

Cable basket 114 is the same as cable baskets 14 on one side thereof, having a stringer 120 attached to riser portions or legs 128 and is open on the other side where transverse sections 124 terminate in connecting portions such as downwardly turned tips 124a. Tips 124a extend over the[]outermost transverse section 24 of cable basket 14 which forms the last segment of pathway "B". In this manner, cable basket 114 is supported on the open side by the adjacent cable basket 14 of pathway "B" and in turn by stanchions 12 which are positioned on either side of pathway "B" immediately adjacent the junction of cable baskets 14 and 114.

In an alternative arrangement, a series of cable baskets 114 are arranged parallel to a first cable pathway formed by a series of cable baskets 14. Downwardly turned tips 124a are extended over the outermost longitudinal section 26 (FIG. 2) of cable basket 14, instead of outermost transverse section 24. In this manner a second cable pathway is formed parallel to that formed by the series of cable baskets 14.

Figure 12:
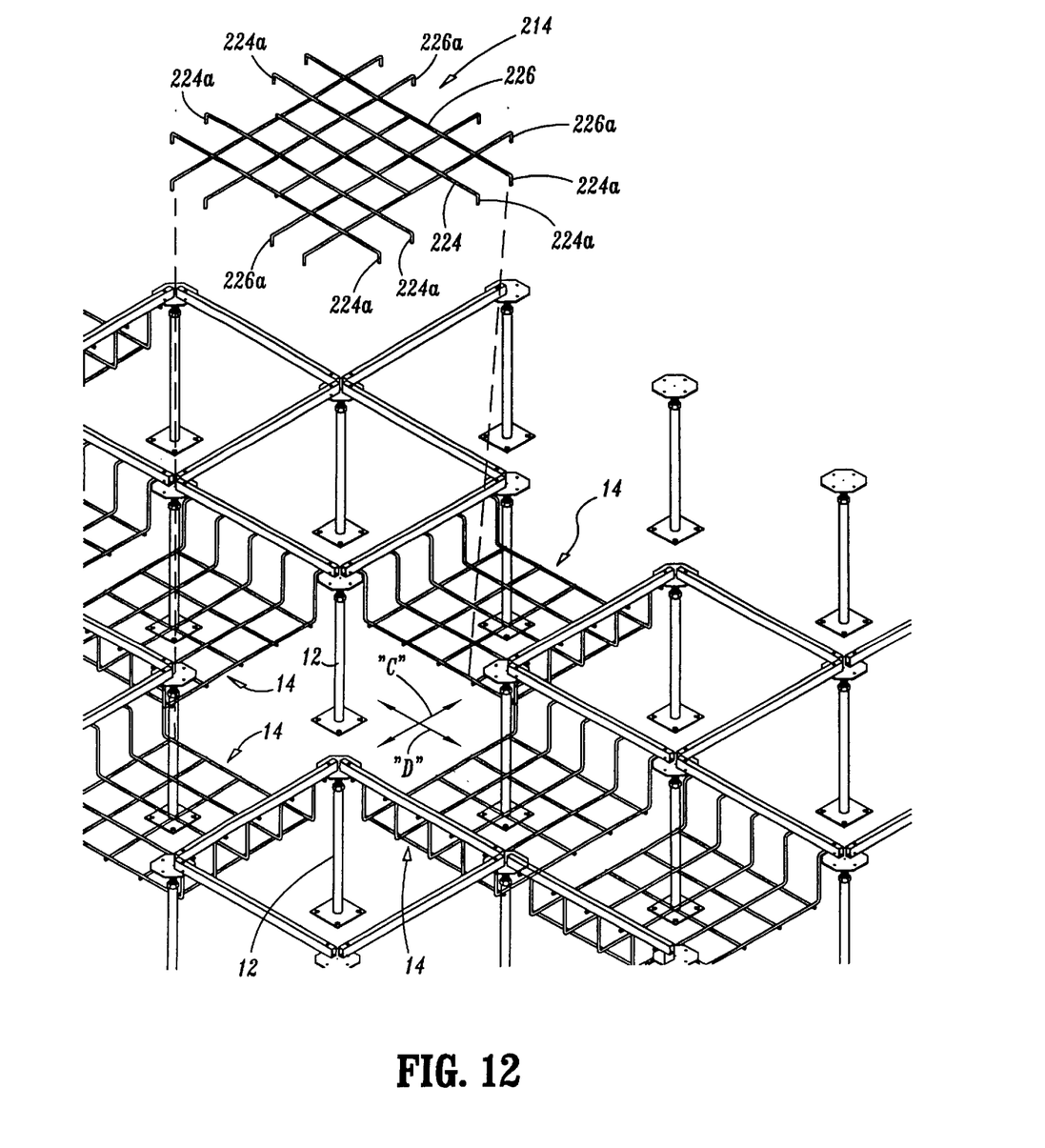
FIG. 12 an enlarged perspective view which shows a cross junction member separated away from intersecting pathways.
Figure 13:
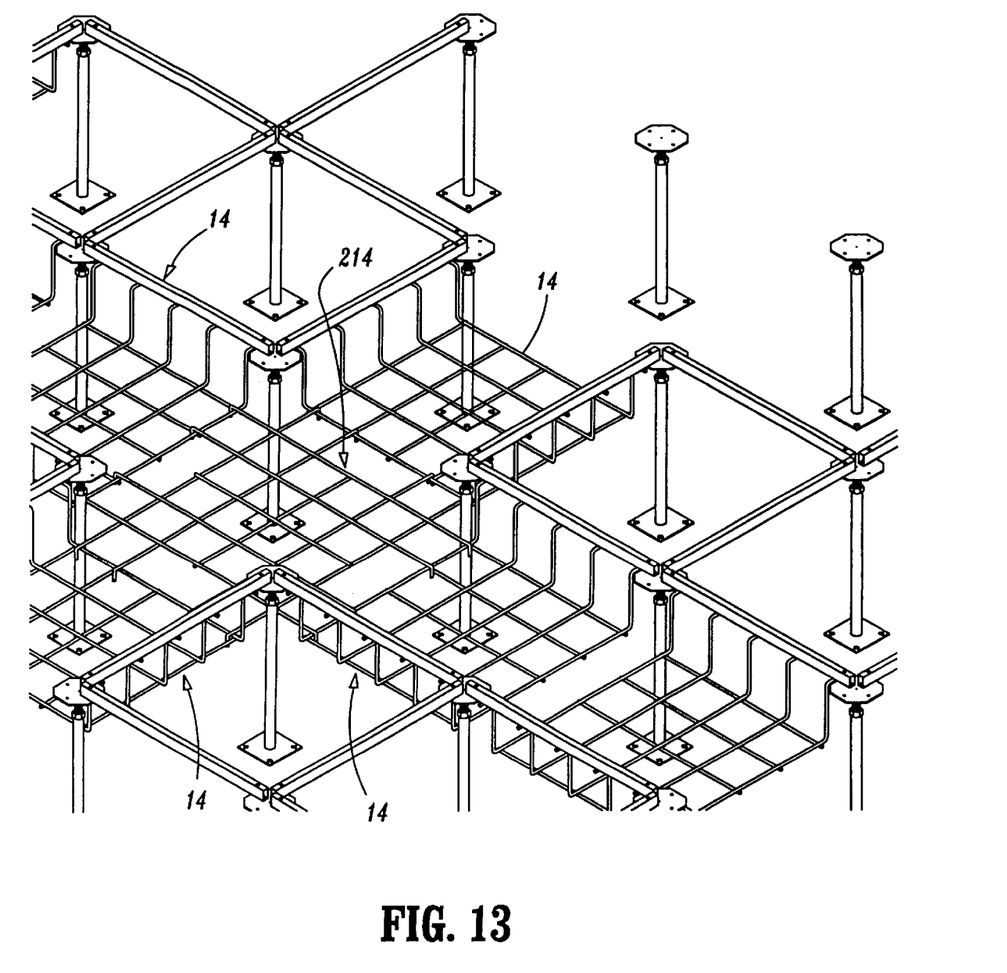
FIG. 13 is a view similar to FIG. 12, which shows the cross junction member in place at the intersection of two perpendicular pathways.

Referring to FIGS. 12 and 13, a cross or four-way type intersection of cable pathways is illustrated wherein two pathways intersect perpendicularly and are designated generally by double headed arrows "C" and "D", FIG. 12. To facilitate a smooth intersection while maintaining support for cable runs placed in the pathways, a four-way junction member 214 is provided. Junction member 214 is formed from a lattice work of wire stock members which are joined together by any suitable techniques such as for example, welding. The ends of at least some of transverse and longitudinal sections 224 and 226 are provided with connecting portions such as downwardly turned tips 224a and 226a respectively. Tips 224a and 226a serve to retain junction member 214 in place when it is positioned at the intersection of pathways "C" and "D", in the same manner as the open side of cable basket 114 as described above.

Figure 14:
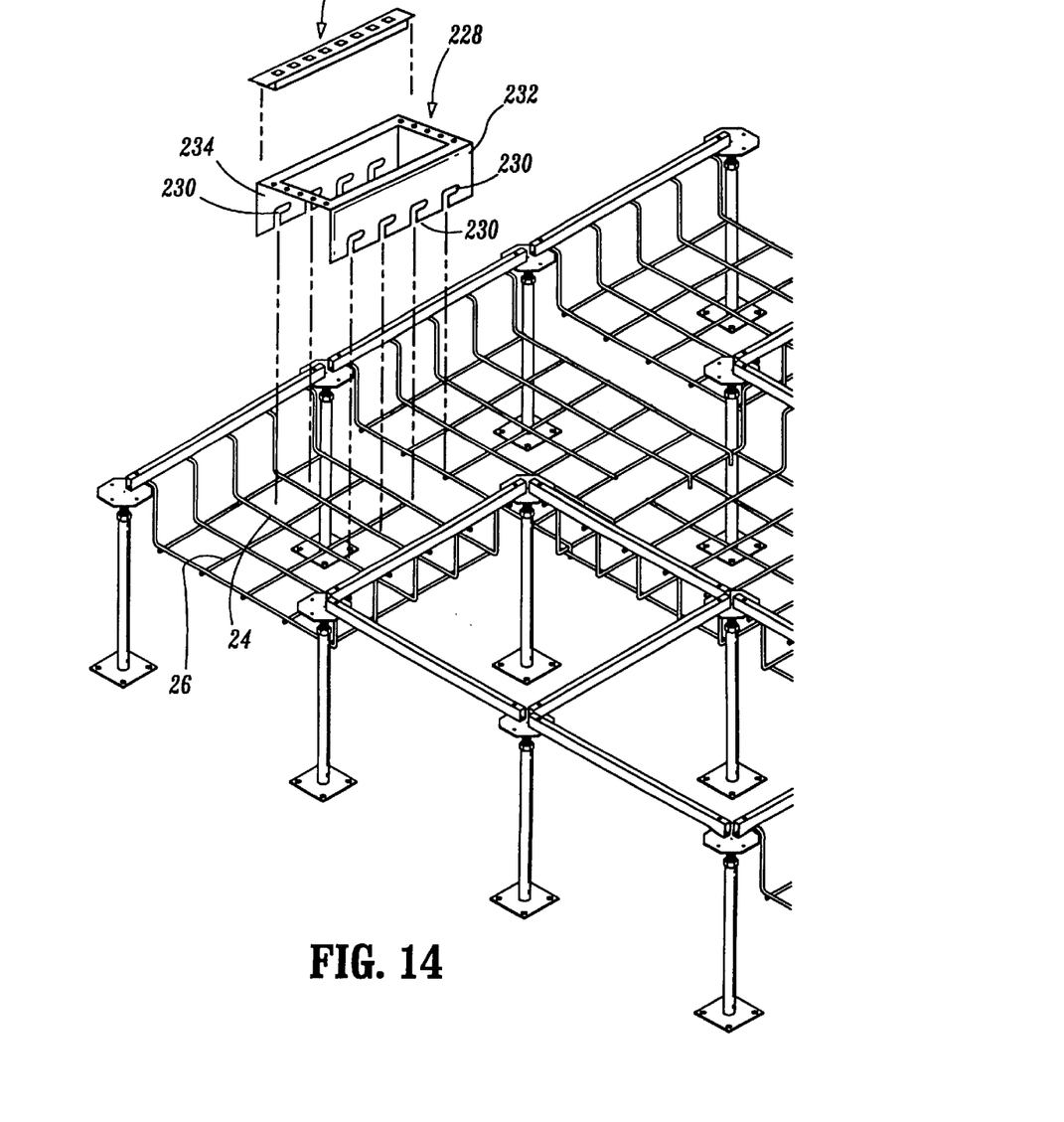
FIG. 14 is a perspective view with parts separated, which shows a hardware mounting bracket which readily attaches to a cable basket member of the cable support assembly.
Figure 15:
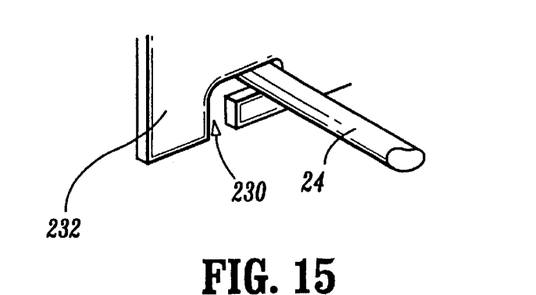
FIG. 15 is an enlarged partial perspective view which illustrates one exemplary method of attaching the hardware mounting bracket of FIG. 14 to the cable basket member.

Referring to FIGS. 14–20 various embodiments of hardware mounting assemblies for mounting hardware relative to the cable support assembly will now be described in connection with the several drawings. A first embodiment of a hardware mounting assembly is shown in FIGS. 14 and 15 and includes a mounting bracket 228 having a series of attachment notches 230 formed along a pair of vertical side panels 232 and 234. Notches 230 facilitate attaching bracket 228 to the cable support assembly. Bracket 228 may be formed from sheet metal which is stamped into blanks and subsequently formed by suitable known techniques.

Notches 230 are preferably spaced apart so that each notch 230 is aligned with a corresponding transverse element 24 or longitudinal element 26 depending upon the orientation desired for attaching bracket 228 to a particular cable basket section 14. Notches 230 may be in the form of a "bayonet" style such that they are aligned above the corresponding transverse or longitudinal elements 24, 26, respectively and bracket 228 is lowered into place and then shifted so that transverse element 24 (as shown in FIG. 15) is fully inserted in notch 230. In this manner, various hardware components may be attached to bracket 228 as desired. For example, a conventional patch block such as patch block 236 may be mounted in a preformed opening on bracket 228.

Figures 16, 17:
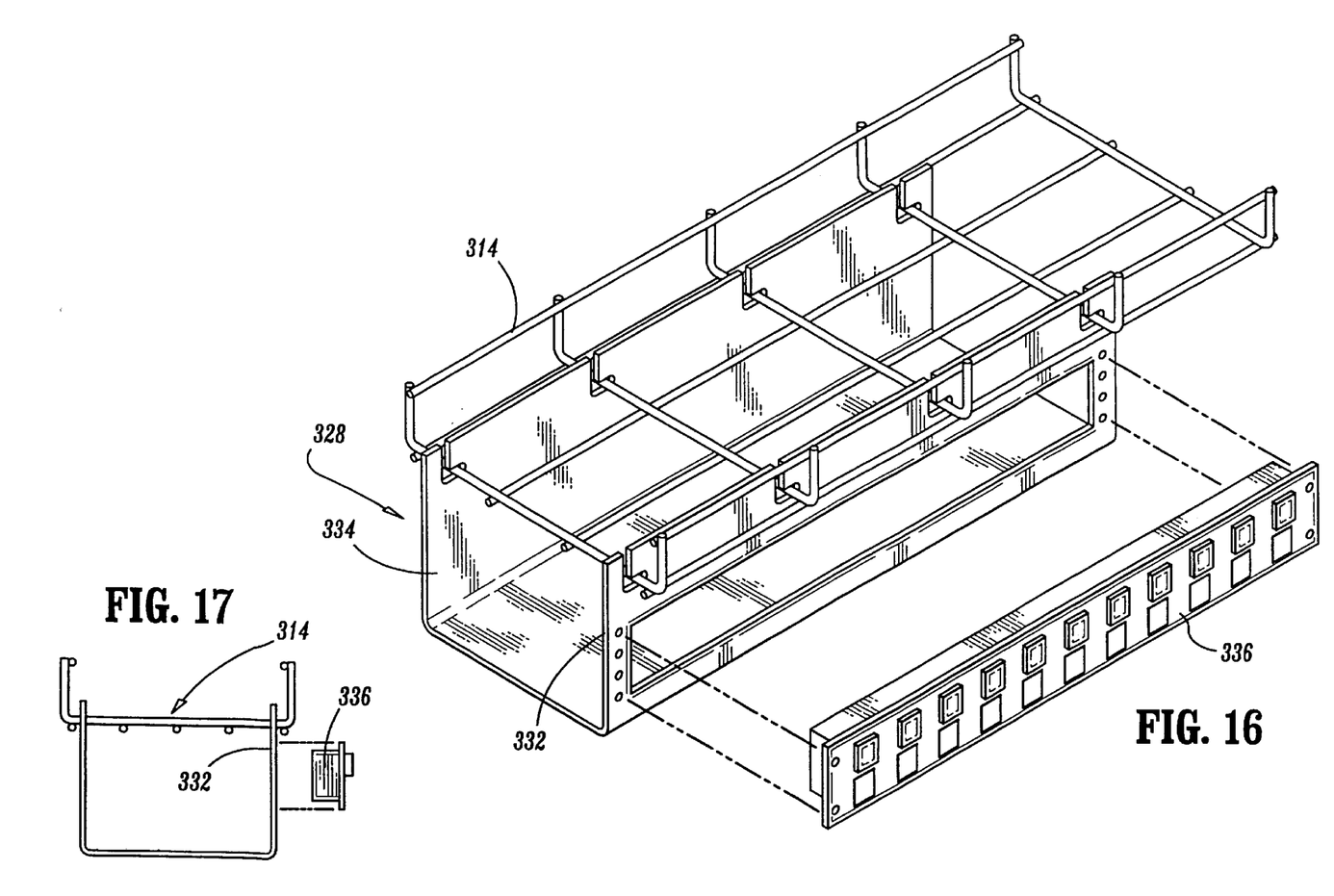
FIG. 16 is a perspective view of a further hardware mounting bracket embodiment which attaches to the underside of a cable basket section.
FIG. 17 is an end view of the embodiment of FIG. 16.

Although bracket 228 is shown mounted to the upper side of the cable support assembly, it may also be mounted to the underside of the cable support assembly using the technique described above. For example, as shown in FIGS. 16 and 17, a mounting bracket 328 is mounted to the underside of a cable basket section 314 of a cable support assembly. Bracket 328 is similar to bracket 228 except that an opening is formed in the side vertical wall portion 332 to facilitate mounting of a hardware element such as patch block 336.

Figure 18:
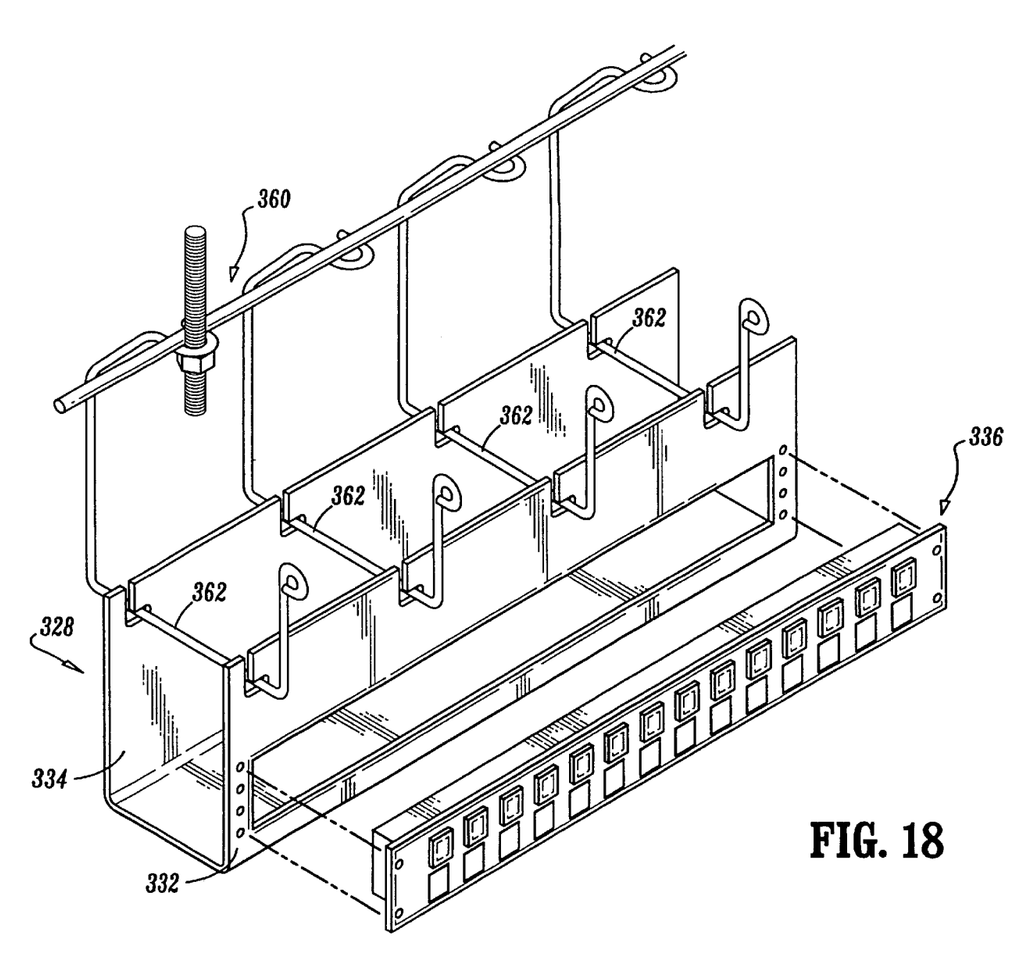
FIG. 18 is a perspective view of a yet another hardware mounting bracket embodiment which attaches to the underside of a different style cable support member section.

Referring to FIG. 18, bracket 328 is shown mounted to a different style cable support apparatus such as flexible cable support apparatus 360 which unlike cable basket section 314, includes only transverse cable support segments 362. Bracket 328 may be formed in numerous different sizes to suit particular cable support apparatus.

Figure 19:
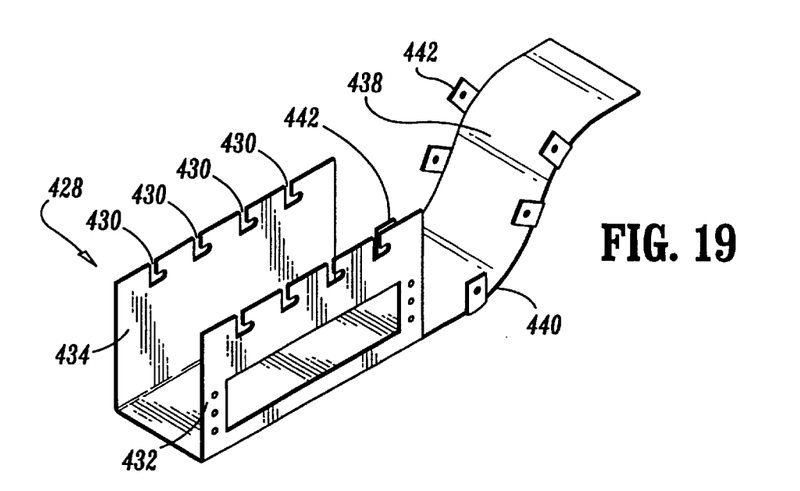
FIG. 19 is a perspective view of still another hardware mounting bracket embodiment which includes a cable support extended portion to support a portion of cable exiting from a cable basket section.
Figure 20:
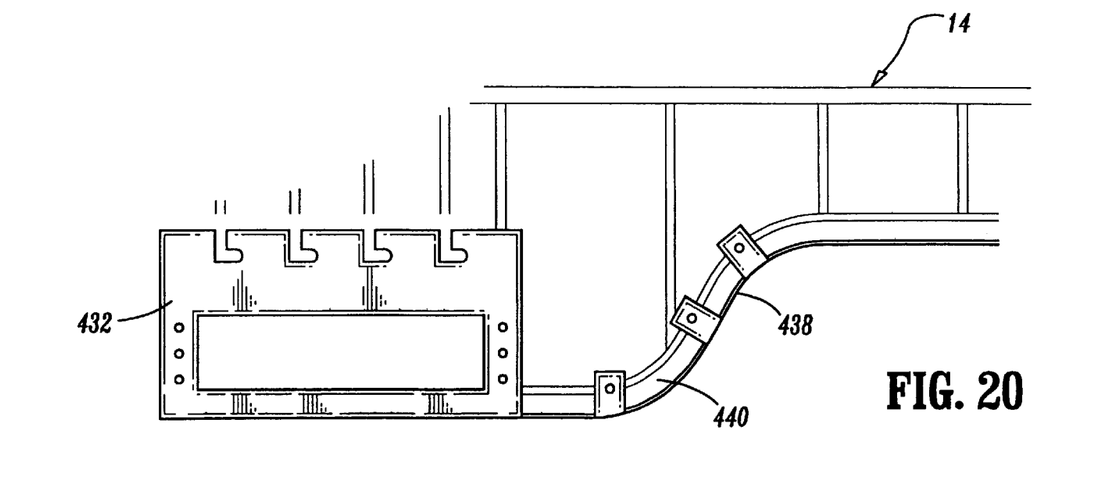
FIG. 20 is an elevation view of the embodiment of FIG. 19.

Referring to FIGS. 19 and 20 a further alternative embodiment of a hardware support bracket is shown. Hardware support bracket 428 is similar to brackets 228 and 328 and further includes a transition portion such as ramp portion 438 which serves to support and direct cables which are desired to be led into bracket 428 to be connected to hardware elements mounted to the bracket, for example a patch block (not shown). Ramp 438 may be stamped as part of a blank from sheet metal which forms bracket 428 and subsequently bent to form the desired ramp contour. Notches similar to notches 430 may be formed on ramp 438 to facilitate attachment to a cable support assembly element such as cable basket section 14. Side walls 440 may be formed as well as tab portions 442 along ramp 438 to facilitate retention of cables by ramp 438.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the appended claims or the disclosure.

What is claimed is:

1. An intersection member for use in a raised floor system having a plurality of support pedestals; a plurality of floor panels; and at least one cable support apparatus wherein the intersection member comprises:

a cable support section; and a plurality of integrally formed connecting portions extending from the cable support section, the plurality of connecting portions being configured and dimensioned to engage a portion of the cable support apparatus such that the cable support section is retained in place when positioned at the intersection of at least two cable pathways and coplanar therewith.

2. The intersection member as recited in claim 1, wherein the connecting portions include downwardly oriented tip portions which are configured and dimensioned to interact with a cable support apparatus of a raised floor system such that the intersection member is supported by the cable support apparatus.

3. The intersection member as recited in claim 1, wherein the intersection member is open on one side thereof to form at least a two-way intersection.

4. The intersection member as recited in claim 1, wherein the intersection member is generally planar to form a four-way intersection between cable pathways.

5. The intersection member as recited in claim 1, which is formed as a lattice work of intersecting members joined together.

6. The intersection member as recited in claim 5, wherein the intersecting members are formed from wire stock.

7. A cable support assembly for use with a raised floor system having a plurality of support pedestals, the cable support assembly comprising:

a plurality of modular cable support apparatus each having at least one elongated stringer element being supported a predetermined distance away from a base by a first pair of a plurality of support pedestals and a channel section suspended from the at least one elongated stringer element, the channel section being configured and dimensioned to support lengths of cable thereon; and at least one intersection member having a cable support section and connecting portions extending from the cable support section, the connecting portions being configured and dimensioned to retain the cable support section in place when positioned at the intersection of at least two cable pathways.

8. A cable support assembly as recited in claim 7, wherein the connecting portions include downwardly oriented tip portions which are configured and dimensioned to interact with the cable support apparatus such that the intersection member is supported by the cable support apparatus.

9. A cable support assembly as recited in claim 7, wherein the intersection member is open on one side thereof to form at least a two-way intersection.

10. A cable support assembly as recited in claim 7, wherein the intersection member is generally planar to form a four-way intersection between intersecting cable pathways as defined by a plurality of cable support apparatus.

* * * * *